(12) United States Patent
Zachmann

(10) Patent No.: US 6,862,026 B2
(45) Date of Patent: Mar. 1, 2005

(54) PROCESS AND DEVICE FOR COLLISION DETECTION OF OBJECTS

(75) Inventor: Gabriel Zachmann, Bonn (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 204 days.

(21) Appl. No.: 10/067,823

(22) Filed: Feb. 8, 2002

(65) Prior Publication Data
US 2002/0154128 A1 Oct. 24, 2002

(30) Foreign Application Priority Data
Feb. 9, 2001 (DE) .......................................... 101 06 023

(51) Int. Cl.[7] .............................................. G06T 15/20
(52) U.S. Cl. ...................... 345/474; 345/419; 345/959; 345/629; 345/958
(58) Field of Search ................................ 345/419, 958, 345/420, 421, 423, 427, 473, 559, 629, 474

(56) References Cited

U.S. PATENT DOCUMENTS 6,326,963 B1 * 12/2001 Meehan ....................... 345/419
6,563,503 B1 * 5/2003 Comair et al. ............... 345/473

OTHER PUBLICATIONS

G. Zachmann, Rapid Collision Detection by Dynamically Alligned DOP–Trees: Proc. of IEEE, VRAIS '98, Atlanta, Georgia, Mar. 1998.

J. Eckstein, E. Schömer, Dynamic Collision Detection in Virtual Reality Applications: 7th Int. Conf. in Central Europe on Computer Graphics and Visualization and Interactive Digital Media, WSCG, 1999, pp. 71–78.

S. Gottschalk, M. Lin, D. Manocha, OBB–Tree: A Hierachical Structure For Rapid Interference Detection: Computer Graphics (SIGGRAPH '96 Proceedings), 1996, pp. 171–180.

G. Zachmann, W. Felger, The Box Tree: Enabling RealTime and Exact Collision Detection of Arbitrary Polyhedra; Informal Proc. First Workshop on Simulation and Interaction in Virtual Environments, SIVE 95, Univ. Iowa, Iowa City, Jul. 1995, pp. 104–112.

* cited by examiner

*Primary Examiner*—Kimbinh T. Nguyen
(74) *Attorney, Agent, or Firm*—Breiner & Breiner, L.L.C.

(57) ABSTRACT

The present invention relates to a process and a device for the collision detection of objects by traversal of hierarcichal binary bounding BoxTrees, in which each bounding box pair of a hierarchically lower level is derived from a bounding box from the immediately above level by means of cutting off two sub-volumes by means of two parallel cut-planes. For the collision detection of a first and a second object, for each second bounding box of the bounding BoxTree of the second object to be checked for overlapping with a first bounding box of the bounding BoxTree of the first object, an auxiliary bounding box is computed which is axis-aligned in the object coordinate system of the first object and encloses the second bounding box with minimal volume, and with which the overlap check is conducted instead of with the second bounding box, and the computation results from the level immediately above are utilized for computation of auxiliary bounding boxes of lower levels. The process makes quick collision detection possible with low memory requirements.

10 Claims, 2 Drawing Sheets

PROCESS AND DEVICE FOR COLLISION DETECTION OF OBJECTS

TECHNICAL FIELD

The present invention relates to a process and a device for collision detection of objects, in which first for the objects hierarchical binary bounding BoxTrees with axis-aligned bounding boxes in the respective object coordinate system and data are provided from which a position of the objects in relation to each other can be derived, which is yielded by conducting a planned transformation step of at least one of the objects, following which a simultaneous traversal of the bounding BoxTrees is conducted, in which checking for overlapping of the bounding boxes and possibly of polygons contained therein determines whether the objects will collide when executing the transformation step.

The described process is used in many fields of technology in which multi-dimensional geometric descriptions of objects are depicted and moved on a computer. For example, in many fields, the movement of three-dimensional objects is simulated by means of computer graphics. An essential step of the simulation is checking whether a just calculated object position is valid, e.g. is collisionfree. An example of a field of application is the field of robotics or remote control of robots, for instance in repairing satellites. Avoiding collisions is essential both in robotics in general as well as in the special field of remote control of robots. Therefore, before each movement step, it is necessary to check whether a step will lead to a collision, which is ensured by quick collision detection for the controlled objects. In robotics, in particular, a further object is path planning. In this case too, collision detection is an elemental step of the process.

Another example of a field of application of the present invention is computer animation systems such as virtual reality systems in which physical objects respectively their movement in a virtual environment are examined.

STATE OF THE ART

Computer-based processes of detecting collisions have been the subject of scientific investigation for a number of years. One of the first disciplines was computational geometry. However, its processes are very complex and can partially only be utilized for special geometric classes so that they are not useful for practical application.

K. Chung's "Quick Collision Detection of Polytopes in Virtual Environments", Proc. of the ACM Symposium on Virtual Reality Software and Technology (VRST 96), M. Green, ed., pp. 125–131, 1996, presents a quick method of collision detection, which however, can only be used for a special geometric class of convex objects. In practical applications, however, this special case is extremely rare so that this method cannot be utilized for the fields of application mentioned in the introduction.

The hitherto known quickest methods of general collision detection are predominantly based on so-called hierarchical bounding volume trees. These are trees whose nodes are bounding volumes which enclose part of the geometry of the object. These bounding volumes may be balls, hexahedra (so-called boxes), cylinders or any other suited volume.

For example, a method of collision detection of objects is known from G. Zachmann's "The BoxTree: Enabling Real-Time and Exact Collision Detection of Arbitrary Polyhedra", Informal Proc. First Workshop on Simulation and Interaction in Virtual Environments", SIVE 95, University of IOWA, IOWA City, July 1995, Pages 104–112, in which hierarchical bounding volume trees whose nodes are hexahedra are employed. For each object to be checked for collision, such a bounding BoxTree, in the present case a binary bounding BoxTree is provided or computed. The bounding boxes are axis-aligned in the object coordinate system of the object to which they are allocated, i.e. their boundary lines run parallel to the axes of this object coordinate system. The root of a bounding BoxTree represents a hexhedra, which completely encloses the respective object. From each hexahedra respectively from each box of a hierarchical level two new boxes are derived for the hierarchical level below, in that the box of the above level is divided into two part volumes which correspond to the new bounding boxes by means of an axis-aligned cut-plane. The bounding boxes of the bottom hierarchical level, the so-called leaves of the tree, just enclose one or several polygons of the geometry of the object.

In the collision check with such a type of method, the intended movement, i.e. the transformation step, of at least one of the objects, is first conducted on a computer. Then the bounding BoxTrees of both objects are traversed according to the given hierarchy. During traversal, the bounding boxes of the bounding BoxTree of the two objects are checked for any overlapping in order to determine whether the objects will collide when carrying out the transformation step. If any overlapping of the bounding boxes down to the leaves of the trees is determined, the polygons contained in the leaves are checked for overlapping. If overlapping does occur, the two objects will collide. If no overlapping of the checked bounding boxes or of the polygons contained in the leaves is determined, the planned transformation step will not lead to a collision of the objects.

In order to utilize such a type method in robotics or in virtual reality, collision detection has to occur in real time and should require as little memory capacity as possible.

The object of the present invention is to provide a process and a device for collision detection of objects, which permits very quick collision detection with little memory capacity requirements.

DESCRIPTION OF THE INVENTION

The object is solved with the process and the device according to the claims. Advantageous embodiments of the process and the device are the subject matter of the sub-claims.

In the present method of collision detection of objects, first for the objects hierarchical binary bounding BoxTrees with axis-aligned bounding boxes in the respective object coordinate system are provided. Furthermore, data are provided from which a position of the objects in relation to each other can be derived, which is yielded by conducting a planned transformation step of at least one object. Following this, simultaneous traversal of the bounding BoxTrees is conducted, in which checking for overlapping of the bounding boxes and possibly of polygons contained therein determines whether the objects will collide when the transformation step is executed. The present process is distinguished by bounding BoxTrees being provided in which each bounding box pair of a hierarchical lower level is derived from a bounding box of the hierarchical level lying immediately above by cutting off two part volumes by means of two parallel cut-planes. For the collision detection of a first and second object, an auxiliary bounding box, which is axis-aligned in the object coordinate system of the first object and contains the second bounding box with minimal volume and with which the overlapping check is conducted instead of with the second bounding box, is computed for each second bounding box of the bounding BoxTree of the bounding BoxTree of the second object to be checked for overlapping with a first bounding box of the bounding BoxTree of the first object. The computation results of the immediately above level are used to compute the auxiliary bounding boxes of lower levels.

The process described here and the respective device are suited for quick collision detection of polygon geometric objects. For the mentioned fields of application, these are usually three-dimensional. However, the process and the device are also suited for geometry of any dimension. A condition of the process, however, is that the geometry of the object is not deformed during this transformation step.

Hierarchical collision detection always is composed of two parts: a pre-processing step and the actual collision detection. The pre-processing step has to be conducted only once for a given geometry of the object. The second part, the actual collision detection is conducted with each collision check.

The proposed process is primarily concerned with actual collision detection. The pre-processing step with which the auxiliary data structures, i.e. the bounding BoxTrees of the objects, are generated is not necessarily a component of the present process. This pre-processing step may occur any time prior to conducting the present process. Computation processes for construction of bounding BoxTrees are familiar to someone skilled in the art. An example of this, is found for instance in the previously mentioned publication by G. Zachmann. Of course, the speed of collision detection may also be influenced by the quality of the provided bounding BoxTree.

The present process respectively the present device receives as input two objects, their respective bounding BoxTrees and a transformation matrix for the object to-be-moved. If both objects are moved, two transformation matrixes or a transformation matrix derived therefrom are provided. The transformation itself can contain a translation, a rotation as well as a uniform scaling. The process generates as output a yes/no reply as well optionally—in the case of a determined collision—all overlapping polygon pairs.

Hierarchical collision detection, as in the present process, is always based on a divide-and conquer-strategy. In the following, by way of example, a pattern of such a strategy is described in connection with FIG. 1. The figure shows, as an example, a two-dimensional representation of objects P and Q to be tested for collision after a transformation step. Each object is surrounded by a box a respectively b, which represents the root of the respective hierarchical bounding BoxTree. Further boxes, so-called children representing a sub-volume of the hierarchical box above are created from these roots in the next lower hierarchical level. Thus FIG. 1 shows that the box a of object P is divided into two sub-boxes $a_l$ and $a_r$ and box b of the object Q into the boxes $b_l$ and $b_r$. This continues in the same manner in the next lower level where for example the two boxes $a_{ll}$ and $a_{lr}$ are formed from box $a_l$. During traversal, the two bounding BoxTrees for object P and Q, the respective boxes are checked for overlapping in each level. If no overlapping of boxes is determined, traversal is ended with the result no overlapping. If overlapping is determined, traversal continues into the leaves of the trees and the polygons there are checked for overlapping. If overlapping of the polygons is determined, the objects collide. If no overlapping is determined there is no collision. This general divide-and-conquer strategy pattern can be summarized as follows for simultaneous traversal of two bounding volume (BV) trees:

a=BV from the tree of object P,
b=BV from the tree of object Q,
a[i], b[i]=children of a respectively b
traverse (a,b):
if a or b is empty: return
if b is a leaf:
  if a is a leaf:
    treat the polygons enclosed by a and b
    return
  if a is no leaf:
    forall i:
      if a[i], b overlap:
        traverse (a[i],b)
if b is no leaf:
  if a is a leaf:
    forall i:
      if a,b[i] overlap:
        traverse (a,b[i])
  if a is no leaf:
    forall i; forall j:
      if a[i], b[j] overlap:
        traverse (a[i], b[j])

In order to be able to process such a pattern very quickly, the individual overlapping check of a given pair of bounding boxes has to be very fast. Axis-aligned bounding boxes are the quickest overlapping check, because their overlapping can be easily checked by computing.

The process presented here employs bounding boxes that are axis-aligned in the object coordinate system as nodes of a binary bounding box hierarchy. The root encloses the entire object, whereas the leaves preferably each enclose exactly one polygon. Inner nodes usually have two children, however, in certain cases having only one child may be more favorable for performance.

In the present process, first a certain simple condition is set for the relationship between parent and children nodes. During simultaneous traversal, the boxes that are usually slanted in relation to the object coordinate system of the other object are enclosed in axis-aligned auxiliary boxes. Subsequently, these axis-aligned auxiliary boxes are checked for overlapping in a canonical manner.

The condition set for the bounding BoxTrees is that the cut-planes are axis-aligned; the children resulting from a node may overlap or be spaced. For this purpose two cut-planes, which are parallel to each other and parallel to one axis of the object coordinate system, are always employed. Due to this condition, there are sufficient degrees of freedom for selecting the box size for adaptation to the respective object.

The process gains its special speed from the cited condition in that all the computation results required for enclosing a box in an axis-aligned box are utilized again in the next lower recursion. A further advantage of this condition is that the bounding box hierarchy on which the present process is based requires very little memory capacity, which also leads to a speed advantage, because in this manner, the cache of the processor becomes much less often invalid.

The present process and the respective device require fewer floating-point operations per node than any other hitherto known collision detection process. Furthermore, the bounding box hierarchy on which the present process is based requires less memory capacity than any other hitherto known hierarchical process. This applies per node and therefore overall, because in a binary hierarchy, the number of nodes is independent of the bounding volume used. Based on these advantages and on the low complexity of the computations conducted with the process, the process is especially suited for implementation in hardware as realized with the present device.

The device comprises at least one input interface for the input of first data for object identification, object description and object transformation, an output interface for the output of the collision detection results, a memory unit to store the first data and the bounding BoxTrees for the objects, a calculating unit designed only for conducting the basic types of calculation and comparison, a control logic for simultaneous traversal of the bounding BoxTrees, which is designed in such a manner that it activates the calculating unit to conduct computation operations and comparisons for carrying out the process, as well as a polygon cutting unit for computing the overlapping of polygons. The device is preferably designed as an insert card for connection to a large computer system. It is especially advantageous to employ a stack, in which the intermediate results computed for the respective levels and pointers to the current nodes of the bounding BoxTrees are deposited.

Furthermore, a separate unit can be provided for conducting the transformation step of the object.

Of course, the polygon cutting unit and the transformation unit may also be combined in a correspondingly designed calculating unit.

BRIEF DESCRIPTION OF THE DRAWINGS

The process and the accompanying device are made more apparent in the following using preferred embodiments with reference to the drawings without the intention of limiting the overall inventive idea.

WAYS OF CARRYING OUT THE INVENTION

Figure 1:
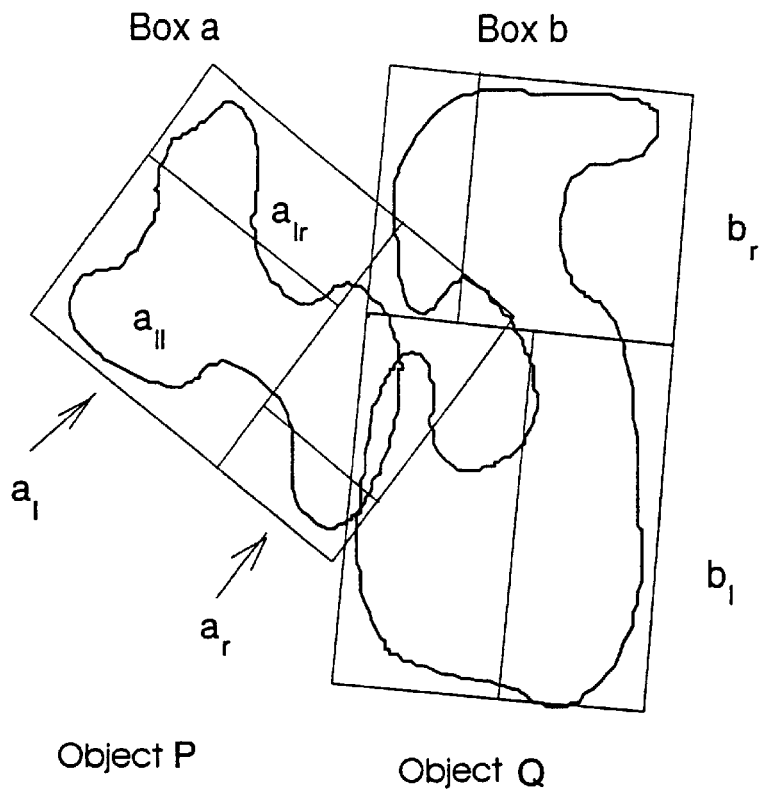
FIG. 1 shows an example of the general pattern of hierarchical collision detection in the form of a divide-and-conquer strategy.
Figure 2:
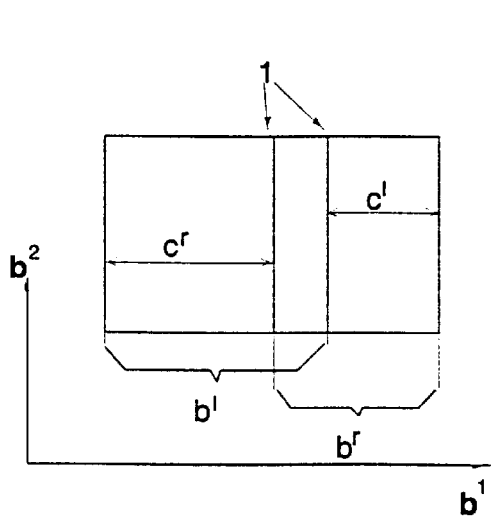
FIG. 2 shows with a two-dimensional example the formation of children boxes from a parent box.
Figure 3:
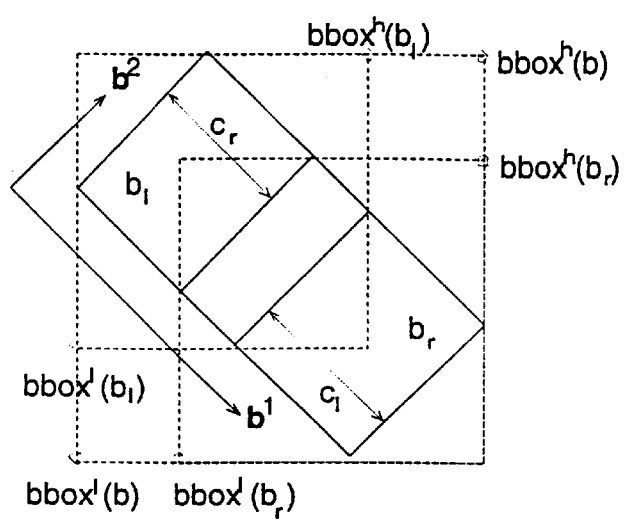
FIG. 3 shows an example of the formation of the auxiliary boxes for the parent and for the children boxes.

In the following, essential features of the present process are briefly explained again using the two-dimensional example of FIGS. 2 and 3. FIG. 2 shows the relationship between the bounding boxes of a lower hierarchical level and the bounding box of the above level. FIG. 3 illustrates the manner of forming auxiliary bounding boxes and the resulting relationship to the auxiliary bounding boxes of the above level.

Based on these relationships, it becomes possible to reuse computation results that are needed for inclusion of a box in an axis-aligned box in the next lower recursion.

If b is a node of the bounding BoxTree, $b_l$ and $b_r$ are its children (one can also present them as "left" and "right" subboxes) yielded by cutting off sub-volumes of box b using two cut-planes 1 that are parallel to each other and to two axes of the object coordinate system (cf. FIG. 2). We denote the single coordinates of box b. with $$b=(b^l_x, b^l_y, b^l_z, b^h_x, b^h_y, b^h_z)$$

The axis-aligned enclosing box of b is denoted with $$bbox(b)=(bbox^l_x(b), bbox^l_y(b), bbox^l_z(b), bbox^h_x(b), bbox^h_y(b), bbox^h_z(b)).$$

As previously mentioned, there is a relationship between $b_l$, $b_r$ and b that nearly all the coordinates of $b_l$ coincide with the coordinates of b and nearly all the coordinates of $b_r$ coincide with the coordinates of b, except $(b_l)^h_\alpha \leq b^h_\alpha$ and $(b_r)^l_\alpha \geq b^l_\alpha$, with $\alpha$ c x, y, z. One can regard $\alpha$ as the cut-plane 1 which divides b in the two children boxes $b_l$ and $b_r$. Octrees are a special case of the box hierarchy defined here. However, octrees are less flexible. Note that the two children boxes may overlap, but there may also be a "gap" between the two.

For simplicity, we will write $c_l := b^h_\alpha - (b_l)^h_\alpha$ and $c_r := (b_r)^l_\alpha - b^l_\alpha$ in the following.

Each node of the thus defined hierarchy must therefore store the following data:

1. the axis $\alpha$;
2. $c_l$ and $c_r$; and
3. if the node is a leaf, a pointer to the allocated polygon.

Let us assume that the simultaneous recursive traversal has reached the two nodes a and b, i.e. a and b overlap (in the sense of the process). Furthermore, let us assume, without limitation of the overall idea, that each has two children.

Now the process must determine if the 4 pairs $(a_l, b_l)$, $(a_l, b_r)$, $(a_r, b_l)$ and $(a_r, b_r)$ overlap. This occurs, for example, for the first pair, in that $b_l$ is enclosed by a box $bbox(b_l)$, which is axis-aligned in the coordinate system of a, and then is checked for overlapping with a. Following this, conversely $a_l$ is enclosed by a box $bbox(a_l)$, which is axis-aligned in the coordinate system of b and is checked for overlapping with $b_l$. The other pairs are checked in an analogue manner.

For simplicity, in the following only the "path" from the coordinate system of b to a is described, because the reverse path runs completely analogue.

The process is based on the observation that 3 of 6 coordinates of $bbox(b_l)$ are identical to the coordinates of $bbox(b)$. Generally, if there are n-dimensional boxes, of a total of 2n, n coordinates are the same, $b^1$, $b^2$, $b^3$ are assumed the axes of coordinates of box b in the coordinate system of a (FIG. 3). Let us assume the cut-plane $\alpha = x = b^1$. Then the x-coordinates of $bbox(b_l)$ are $$bbox^h_x(b_l) = \begin{cases} bbox^h_x(b) - c_l b^1_x, & b^1_x > 0 \\ bbox^h_x(b), & b^1_x \leq 0 \end{cases}$$

and $$bbox^l_x(b_l) = \begin{cases} bbox^l_x(b), & b^1_x > 0 \\ bbox^l_x(b) - c_l b^1_x, & b^1_x \leq 0 \end{cases}$$

The x-coordinates of $bbox(b_h)$ are analogue $$bbox^h_x(b_r) = \begin{cases} bbox^h_x(b), & b^1_x > 0 \\ bbox^h_x(b) + c_r b^1_x, & b^1_x \leq 0 \end{cases}$$

und $$bbox^l_x(b_r) = \begin{cases} bbox^l_x(b) + c_r b^1_x, & b^1_x > 0 \\ bbox^l_x(b), & b^1_x \leq 0 \end{cases}$$

The other coordinates are computed in an analogue manner. For the other cases $\alpha = y, z$, the formulae are also analogue. Although FIG. 3 is two-dimensional, one can readily see that generally the above formulae apply to a n-dimensional case.

The process does not only save half of the computations, but also half of all the required checks to determine the overlapping of two axis-aligned boxes, with one of them being determined by the above formulae. This is possible because half of the coordinates remain constant.

Let us assume that bbox(b) and a overlap. Now it should be determined if the bbox($b_j$) and a overlap. Again let us assume α=x. Then the following comparison must be conducted on the x-axis:

$$\left.\begin{array}{l} b_x^l > 0 \wedge bbox_x^h(b_1) < a_x^l \\ b_x^l \leq 0 \wedge bbox_x^l(b_1) > a_x^h \end{array}\right\} \Rightarrow \begin{array}{l} bbox(b_1) \text{ und } a \\ \text{do not overlap} \end{array}$$

Note that the check $b_x^l <> 0$ was already run when $bbox_x^h(b_j)$ or $bbox_x^l(b_j)$ were computed.

Overall, the number of floating point operations for a box-box overlapping check comprises at most 3 multiplications, 4 additions and 5 comparisons. The number of operations of a recursion step comprises 12 multiplications, 16 additions and 20 comparisons: 2×(3×2 mult.+3×2 add.) to enclose the four children in axis-aligned boxes, and 2×(2 ×3+2×2 comparisons) for the overlapping checks. This applies for the most unfavorable case. The average case requires less operations.

If one only conducts the check a ∩ bbox (b) and leaves out the reverse check bbox (a) ∩ b, only half the operations are required. Depending on the implementation and architecture, the one or the other variant may be faster.

Figure 4:
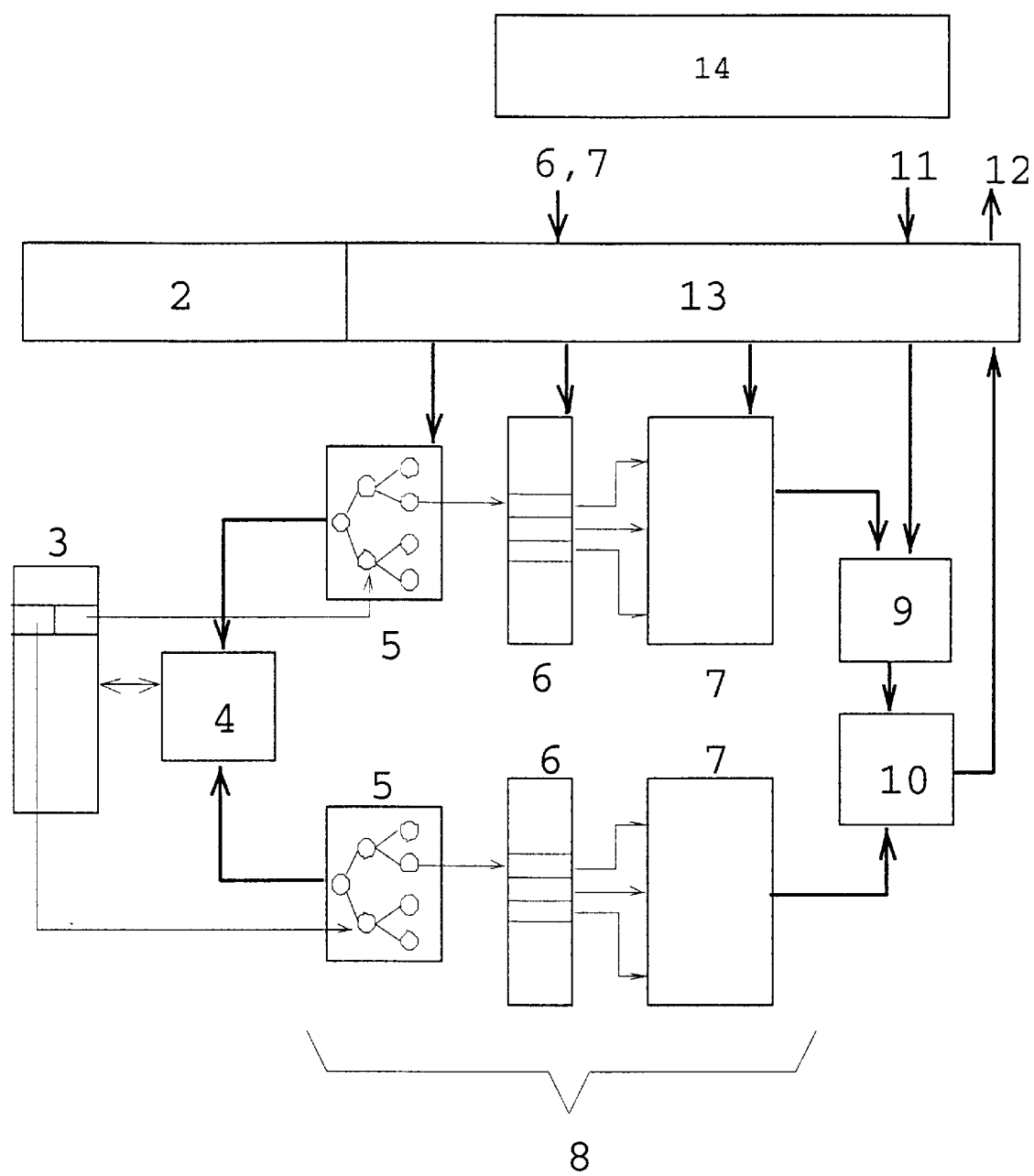
FIG. 4 shows an example of a buildup of the invented device.

One possibly way to translate the present variant into hardware is shown in FIG. 4.

In the figure bold arrows represent the essential data paths. Thin arrows stand for the essential pointers between the data. Blocks 5, 6 and 7 represent the bounding box hierarchy, a polygon array and the point array. Polygons are represented here as three or more indices in the point array. The data lie in the common memory 8 of the collision detection hardware. Of course, the memory of the hardware holds, i.a. such data for many objects. All data remain in the hardware memory as long as they are valid. They may have to be swapped by a control logic in the main memory of the computer if too many objects have been registered for collision detection.

First the polygons and the points are loaded in memory 8 via the API 14 (Application Programming Interface) and the hardware interface 13. Preferably the API 14 also assumes the computation of the bounding box hierarchy in the software, because it is not time critical.

In the event of a collision, the interface supplies the indices 12. The calculating unit 4 is responsible for traversal of the hierarchies and the execution of the previously explained formulae and comparisons. This means that this calculating unit 4 is relatively simple, because it only has to implement four basic types of arithmetic and comparisons.

At the beginning of a collision check, the interface 13 receives from API 14 the IDs of the two objects to be checked and a matrix 11, which transforms one of the two objects into the coordinate system of the other object. In this way, the control logic 2 initializes stack 3 and the calculating unit 4. Then the control logic 2 enters the roots of the bounding box hierarchies into the calculating unit 4 and conducts the operations of the process. Then depending on the result of the comparisons, the pointers are placed on the current nodes in the hierarchies and the intermediate results from the calculations are placed on stack 3. Following this, a pair of children of the current nodes is entered in the calculating unit 4 and the process starts anew.

If the calculating unit 4 determines that the current pair of nodes do not overlap, an earlier pair is taken from stack 3. The intermediate results stored with this pair on stack 3 are loaded in calculating unit 4 and the calculating unit continues.

If the calculating unit 4 determines that a pair of nodes overlap and this pair are leaves in the hierarchy, the pointers are pursued from the leaves in the index array and from there in the point array. The resulting points form two triangles which are loaded in the polygon cutting unit 10. A random number of n corners can be treated in an analogue manner. One of the two polygons runs through the transformation matrix for the respective object. The polygon cutting unit 10 computes a point of intersection of the two triangles if there is one. This is relatively simple for triangles and can be carried out by a standard process, such as the one, for example, known from Held, M. ERIT: "A Collection of Efficient and Reliable Intersection Tests", Journal of Graphics Tools, 2(4):25–44, 1997.

If there is a point of intersection, this is relayed to interface 13 and stored in the output FIFO. If the application wants to determine all the points of intersection, the calculating unit 4 and control logic 2 continue, i.e. take the two parent nodes from stack 3 and continue the process. Or control logic 2 can stop and inform the API that the results are available.

The API 14 should be designed in such a manner that collision detection is computed asychronously. This has the advantage that the application can continue with other tasks and get the results of the collision detection later. Furthermore, the API should be similar to OpenGL (OpenGraphics Language), because this is widely used in computer graphics. The following functions should be available in this manner or a similar manner in an API for collision detection hardware.

| Function | Description |
| --- | --- |
| colInit | provides a new "context" analogue to glXCreate Context |
| colNewObject | reports a new object for collision detection; the function provides the ID, with aid of which the application can identify the object for the API; then the API expects to receive the list of polygons and points from the application, with the aid of the following functions; |
| colIndex | provides a point index, which is attached to the list of indices |
| colVertex | provides a point index, which is attached to the list of points |
| colEndObject | ends the transmission of the actual object; this actuates the computation of the bounding box hierarchy; this function does not pass the control to the application until this computation is finished; |
| colCheck | actuates a collision check; supplied are: two object IDs, a matrix, a memory address for indices, and a memory address for points; the collision hardware checks the collision in accordance with the above-mentioned process and stores possibly found polygons as index in the passed on memory section of one of the index arrays deposited by the application; possibly found points of intersection are also stored in the point array deposited by the application in the main memory. |
| colDeleteObject | deletes all data structures of an entered object ID from the memory of the hardware. |

The above list is, of course, incomplete. For simplification, it was assumed that an object consists only of triangles, which is no restriction. If rectangles or even random polygons are to be treated, the API must be extended by a few functions.

Of course, data could also be transmitted via DMA (Direct Memory Access). In this case, for example, transmission of the complete point list would occur at one time with the function colTriangles (const colVec * points). The principle, however, would be the same.

```
context=colInit( );
i=0, 1:
    id[i]=colNewObject (context);
    p=0 . . n-1:
    colIndex(index [i] [p]);
    v=0 . . nvertices-1:
    colVertex (vertex[i] [v] [0], vertex[i] [v] [1],
        vertex[i] [v] [2]);
    colEndObject( );
c=colCheck (id[0], id[1], m, colindex, colvertex);
```

LIST OF REFERENCE NUMBERS 1 cut-planes
2 control logic
3 stack
4 calculating unit
5 BoxTree
6 polygon
7 points
8 memory
9 transformation unit
10 polygon cutting unit
11 matrix
12 indices
13 interface of API, FIFOs
14 API

What is claimed is:

1. A process for collision detection of objects comprising providing the objects with first hierarchical binary bounding BoxTrees with axis-aligned bounding boxes in a respective object coordinate system; providing data from which a position of the objects in relation to each other is derivable by conducting a planned transformation step of at least one object; and conducting a simultaneous traversal of said bounding BoxTrees during which, by means of an overlap check of said bounding boxes and of possible polygons contained therein, collision or non-collision of the objects is determined; wherein bounding BoxTrees are provided in which each bounding box pair of a hierarchically lower level is derived from a bounding box from an immediately higher level by cutting off two sub-volumes by means of two parallel cut-planes; and wherein for said collision detection of a first object and a second object, checking each second bounding box of the bounding BoxTree of said second object for overlap with a first bounding box of the bounding BoxTree of said first object, computing an auxiliary bounding box which is axis-aligned in the object coordinate system of said first object and encloses said second bounding box with minimal volume, and conducting therewith said overlap check as opposed to with said second bounding box and utilizing computation results from the immediately higher level for computation of auxiliary bounding boxes of lower levels.

2. A process according to claim 1, wherein in determining overlap for said first bounding box, a first auxiliary bounding box is computed which is axis-aligned in the object coordinate system of said second object and encloses said first bounding box with minimal volume, and conducting an additional overlap check between said second bounding box and said first auxiliary bounding box in order to verify presence of overlap, and utilizing the computation results from the immediately higher level for computation of auxiliary bounding boxes of lower levels.

3. A process according to claim 1, further comprising providing said data by a transformation matrix for said at least one object.

4. A process according to claim 1, wherein in determining a collision, providing information on all pairs of mutually intersecting polygons.

5. A process according to claim 4, wherein the polygons are triangles.

6. A process according to any one of claims 1 to 5 wherein said collision detection is of objects in robotics.

7. A device for collision detection of objects according to the process of any one of claims 1 to 5, comprising an input interface for input of first data for object identification, object description and object transformation;

an output interface for output of collision detection results;

a memory unit for storing said first data and the data of the bounding BoxTrees of the objects;

a calculating unit;

a control logic for simultaneous traversal of said bounding BoxTrees, said control logic being adapted to actuate said calculating unit to conduct calculation operations and comparisons for executing the process according to any one of claims 1 to 5.

a stack for inputting intermediate results and pointers to current nodes of the bounding BoxTrees; and a polygon cutting unit for calculation of overlap of said polygons.

8. A device according to claim 7, further comprising a transformation unit for computation of said object transformations.

9. A device according to claim 7 further comprising an API (Application Programming Interface) adapted to compute said bounding box hierarchy.

10. A device according to claim 7 wherein said device is structured as an insert card for a computer system.

* * * * *

UNITED STATES PATENT AND TRADEMARK OFFICE
CERTIFICATE OF CORRECTION

PATENT NO. : 6,862,026 B2
DATED : March 1, 2005
INVENTOR(S) : Gabriel Zachmann

It is certified that error appears in the above-identified patent and that said Letters Patent is hereby corrected as shown below:

Column 5,
Line 63, insert a period -- . -- after the formula.

Column 6,
Line 5, "$(b_r)^1{}_\alpha \gneq b^1{}_\alpha$," should read -- $(b_r)^1{}_\alpha \geq b^1{}_\alpha$, --.
Line 37, insert a period -- . -- after "are the same".

Column 10,
Lines 25-26, "A device for collision detection of objects according to the process of any one of claims 1 to 5, comprising" should read -- A device for collision detection of objects comprising --.
Line 41, "any one of claims 1 to 5." should read -- any one of claims 1 to 5; --.

Signed and Sealed this

Thirteenth Day of December, 2005

JON W. DUDAS
*Director of the United States Patent and Trademark Office*